No. 655,035. Patented July 31, 1900.
H. L. VERWOHLT.
MACHINE FOR TREATING LIBERIAN COFFEE FRUIT BEFORE SHELLING SAME.
(Application filed Nov. 26, 1897.)
(No Model.)
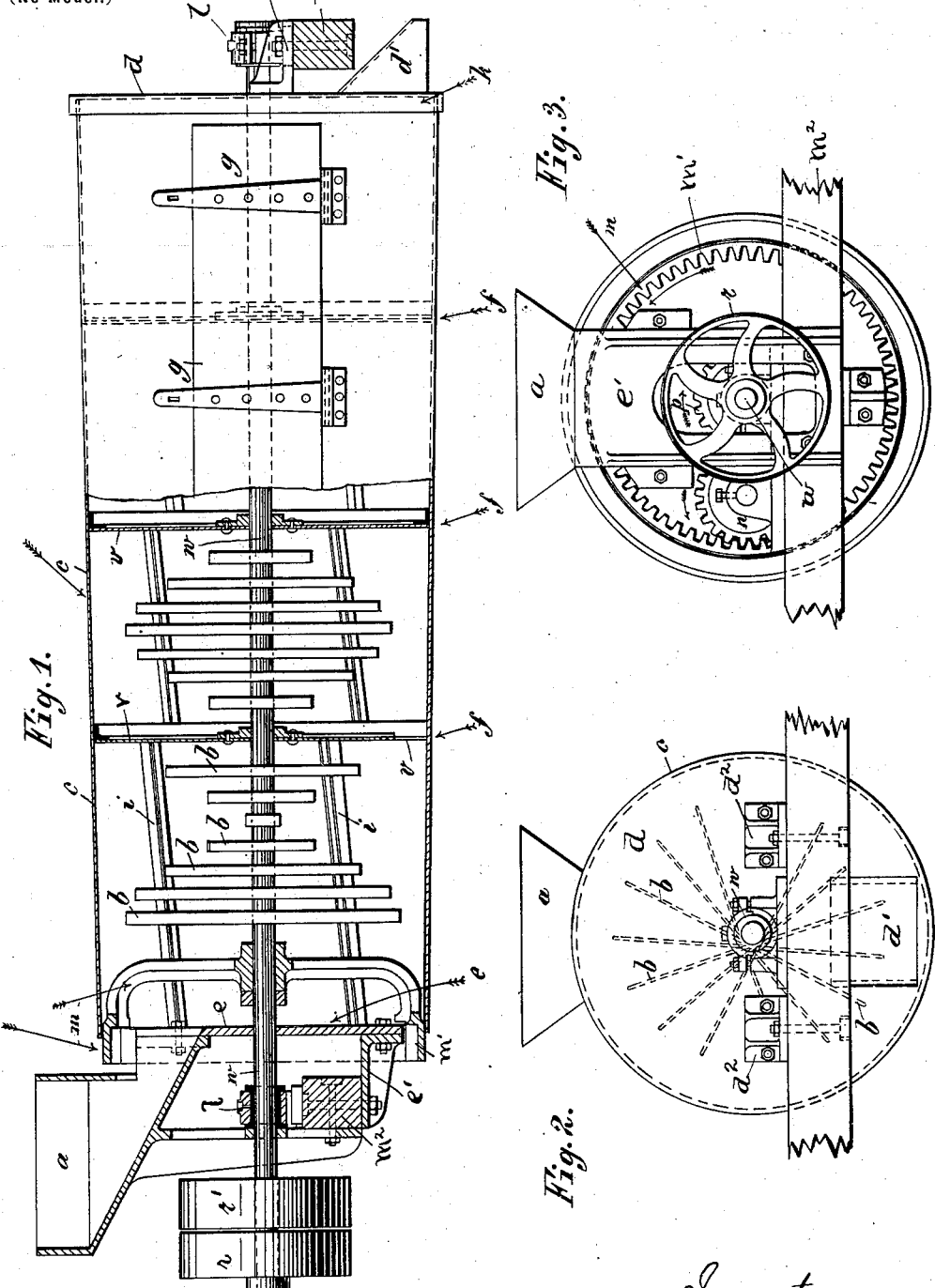
Inventor:
Heinrich L. Verwohlt.
By
Alexander & Dowell
Attys.

UNITED STATES PATENT OFFICE.

HEINRICH LUDWIG VERWOHLT, OF PASOEROEAN, ISLAND OF JAVA, ASSIGNOR TO THE MAATSCHAPPY TER EXPLOITATIE VAN DE CONSTRUCTIEWINKEL DE BROMO, OF SAME PLACE.

MACHINE FOR TREATING LIBERIAN COFFEE-FRUIT BEFORE SHELLING SAME.

SPECIFICATION forming part of Letters Patent No. 655,035, dated July 31, 1900.

Application filed November 26, 1897. Serial No. 660,178. (No model.)

*To all whom it may concern:*

Be it known that I, HEINRICH LUDWIG VERWOHLT, a subject of the Queen of the Netherlands, residing at Pasoeroean, in the Island of Java, have invented a new and useful Machine for Treating Coffee Fruit or Beans Before Shelling the Same, (for which I have applied for foreign patents as follows, viz: England, No. 26,822, dated November 16, 1897; Germany, No. 100,381, dated November 11, 1897; Austria, No. 47/5,290, dated November 17, 1897; France, No. 272,180, dated November 15, 1897; Belgium, No. 131,829, dated November 12, 1897, and British India, No. 79/189,830, dated February 22, 1898,) of which the following is a specification.

The object of the present invention is to produce a machine for loosening or softening the outer shells or hulls of coffee-beans, so that the beans can thereafter be very quickly separated from the hulls in an ordinary hulling-machine. This is accomplished by subjecting the unhulled coffee-beans to the stroking action of series of tangentially-disposed rotary beaters or arms arranged within a series of chambers or compartments in an oppositely-rotating ribbed cylinder, the action being such that while the beans are not crushed the outer hulls will be softened or loosened.

The invention consists in the novel construction and combination of parts hereinafter described and claimed, and the accompanying drawings illustrate an efficient form of the machine embodying my invention.

In the drawings, Figure 1 is a partial side elevation and part longitudinal section of the complete machine. Fig. 2 is a rear end view thereof. Fig. 3 is a front end view thereof.

Referring to said drawings, $c$ designates the cylindrical case or shell of the machine, which is rotatably supported upon a shaft $w$, extending axially therethrough and journaled in suitable stationary bearings 1 on a stationary framework $m^2$, the casing being divided interiorly into a series of compartments by transverse partitions $y$, which are loosely journaled upon the shaft, but attached to the casing and serve to strengthen and support the same. These partitions detain the beans in each compartment sufficiently long to insure the proper treatment thereof, and the partitions have openings $f$ in their peripheries through which the beans eventually pass through the several compartments successively. The discharge end of the cylinder is closed by a stationary head $d$, provided with an outlet $d'$ and supported by the brackets $d^2$ on the stationary frame, as shown. The front end of the cylinder is closed by a stationary head $e$, which is supported on a bracket $e'$, attached to the stationary framework, as shown, and to head $e$ is attached a feed-hopper $a$, as shown.

The receiving end of cylinder $c$ is mounted on a spider $m$, loosely journaled on shaft $w$ and having an internal crown-gear $m'$, which meshes with a pinion $n$, in turn meshing with a pinion $p$, fixed on shaft $w$, as shown in Fig. 3, so that the shaft and casing will rotate in opposite directions. The shaft can be driven by means of a belt running from a driving-pulley to fast and loose pulleys $r$ and $r'$ on the shaft, as shown.

Upon the shaft $w$ within each compartment are secured a series of tangentially-arranged stirring-arms or beaters $b$, as indicated in the drawings, by which the beans in the compartments will be thoroughly agitated. These beaters also tend to feed the beans toward the discharge end of the machine and act in conjunction with longitudinally-inclined inwardly-projecting ribs $i$, attached to the inner periphery of the cylinder $c$. The spaces between the extremities of the beaters $b$ and the ribs $i$ as the beaters pass the ribs are slightly narrower than the size of the unhulled beans, so that the latter cannot pass between the ribs and the beaters without being thoroughly worked thereby and the shells loosened therefrom.

In the present invention, which is designed for the preliminary treatment of Liberian coffee-beans, the action of the beaters upon the beans is not by direct strokes, but rather of a stroking character. For this purpose the beaters are not arranged radially but tangentially on shaft $w$. This position of the beaters causes them to loosen the outer shell of the beans in such a manner that the complete shelling of the same by subsequent treatments thereof is facilitated.

It will be observed that the cylinder c is slightly conical in form, being largest at its discharge end, so that the beans when on the bottom thereof tend to move from the left to the right toward the discharge. The ribs i stir the beans and continually lift them upward and bring them in position to be most effectively operated upon by the beaters. The cylinder rotates in one direction, while the shaft and beaters therein rotate in the opposite direction, the cylinder moving more slowly than the arms. The ribs i on the interior of the cylinder carry the beans upward, and as the beans fall off the ribs they are struck by the beaters and their shells loosened by the stroking action thereof. Access to the interior of the cylinder or any of the compartments therein may be had through a longitudinal opening in the side of the cylinder, which is closed by a hinged door g, as indicated in the drawings. The beaters b are preferably stiff and made of wrought metal.

Having thus described my invention, what I therefore claim as new, and desire to secure by Letters Patent, is—

1. The combination of a cylinder, a series of transverse partitions therein dividing its interior into a series of transverse compartments, said partitions having openings to permit the passage of material successively from one compartment to another, and a series of longitudinally-disposed inwardly-projecting ribs attached to the cylinder within each compartment; with a shaft extending axially through the cylinder and a spirally-arranged series of beaters attached tangentially to the shaft within each compartment; and means for oppositely rotating the shaft and cylinder, for the purpose and substantially as described.

2. In a machine for treating coffee-beans, the combination of a rotary cylinder, partitions therein dividing it into a series of transverse communicating compartments, and longitudinally-inclined ribs i, in each compartment; with a rotary shaft extending axially through the cylinder and a series of tangential spirally-arranged beaters secured to said shaft within each compartment adapted to coöperate with the ribs to loosen the hulls of the coffee-beans, said cylinder rotating oppositely to the beaters, for the purpose and substantially as described.

3. The combination of a rotary conical cylinder, a series of partitions forming transverse compartments therein, said partitions having openings at their peripheries to permit the passage of material from one compartment to another, a series of longitudinally-inclined inwardly-projecting ribs attached to the cylinder, with a rotary shaft extending through the cylinder, a spiral series of tangential beaters attached to the shaft within each compartment adapted to coöperate with the ribs and loosen the hulls by a stroking action, and means for rotating said cylinder oppositely to the said shaft and beaters for the purpose and substantially as described.

In witness whereof I have hereunto set my hand in presence of two witnesses.

HEINRICH LUDWIG VERWOHLT.

Witnesses:
KARL HARTMAN,
ALBERT ELLIS.